United States Patent
Yao

(10) Patent No.: US 6,941,822 B2
(45) Date of Patent: Sep. 13, 2005

(54) ANGULAR DISPLACEMENT SENSING SYSTEM AND METHOD USING BRUSHLESS DC MOTOR COMMUTATION HALL EFFECT SENSORS

(75) Inventor: Yixin Yao, Ann Arbor, MI (US)

(73) Assignee: Visteon Global Technologies, Inc., Van buren Township, MI (US)

(*) Notice: Subject to any disclaimer, the term of this patent is extended or adjusted under 35 U.S.C. 154(b) by 127 days.

(21) Appl. No.: 10/458,346

(22) Filed: Jun. 10, 2003

(65) Prior Publication Data

US 2004/0250630 A1 Dec. 16, 2004

(51) Int. Cl.[7] .............................................. G01L 3/02
(52) U.S. Cl. ........................ 73/862.325; 73/862.08
(58) Field of Search ......... 73/862.325, 862.08–862.321

(56) References Cited

U.S. PATENT DOCUMENTS

| | | | |
|---|---|---|---|
| 4,838,574 A | | 6/1989 | Baraszu |
| 5,080,736 A | * | 1/1992 | Matsui ..................... 156/64 |
| 5,320,421 A | * | 6/1994 | Kade et al. .............. 303/162 |
| 5,382,890 A | * | 1/1995 | Moh et al. ................ 318/254 |
| 5,402,341 A | | 3/1995 | Liubakka et al. |
| 5,475,596 A | * | 12/1995 | Henry et al. ............... 701/37 |
| 5,497,324 A | | 3/1996 | Henry et al. |
| 5,986,419 A | | 11/1999 | Archer et al. |
| 5,998,946 A | * | 12/1999 | Kim ........................ 318/254 |
| 6,300,739 B1 | | 10/2001 | Ratliff et al. |
| 6,354,396 B1 | | 3/2002 | Horton et al. |
| 6,363,305 B1 | | 3/2002 | Kaufmann et al. |
| 6,364,050 B1 | * | 4/2002 | Horton .................... 180/446 |
| 6,498,451 B1 | | 12/2002 | Boules et al. |
| 6,505,703 B2 | | 1/2003 | Stout et al. |
| 2003/0005764 A1 | | 1/2003 | Colarelli, III et al. |

* cited by examiner

*Primary Examiner*—Edward Lefkowitz
*Assistant Examiner*—Alandra Ellington
(74) *Attorney, Agent, or Firm*—Brinks Hofer Gilson & Lione

(57) ABSTRACT

A method and system for sensing angular displacement is provided. More specifically, the system includes a brushless DC motor, three Hall effect sensors, an angular displacement signal processor, and an output state observer. The Hall effect sensors provide three electrical angles of the motor rotor which are used in an angular displacement signal processor that is implemented in hardware and software. The angular displacement signal processor provides an improved resolution angular displacement output. Based on the angular displacement output from angular displacement signal processor and the motor control command signal from the motor drive, an output state observer is applied to generate a high resolution angular displacement signal.

12 Claims, 4 Drawing Sheets

ANGULAR DISPLACEMENT SENSING SYSTEM AND METHOD USING BRUSHLESS DC MOTOR COMMUTATION HALL EFFECT SENSORS

TECHNICAL FIELD

The present invention generally relates to a system and method for sensing an angle or angular displacement. More specifically, the invention relates to a system and method for sensing an angle or angular displacement with improved resolution in a system with a brushless DC motor using Hall effect sensors.

BACKGROUND

Conventional sensing technologies employed to determine the angle or angular displacement of a shaft of a motion control system include encoders, resolvers, and potentiometers. These sensing technologies are readily available, however, they require a fair amount of space to connect to the shaft. Further, these technologies can also be quite costly when implemented in a high volume product.

However, less costly prior art technology for measuring angular displacement of a shaft of a motion control system is available. This technology utilizes three Hall effect sensors mounted in a brushless DC motor to provide motor commutation signals. The three Hall effect sensor signals are indicative of three electrical angles of the motor rotor. Brushless motors produce motion according to the commutation logic based on these three electrical angles of the motor rotor measured by the Hall effect sensors.

The use of the Hall effect sensors in conjunction with a brushless motor provides a much more cost effective method of sensing the angular displacement of the shaft of a motion control system. The Hall effect technology also employs no moving parts resulting in higher reliability. The disadvantage of using Hall effect sensors in the brushless motor to sense angular displacement of a shaft of a motion control system, is that the angular measurement resolution is typically lower than that of an encoder, resolver, or potentiometer.

Additionally, known techniques of processing Hall effect sensor signals to provide an angle or angular displacement have included the use of an index position signal to track the number of shaft resolutions. The index position requires an additional sensor and additional processing hardware. The additional components increase the cost and complexity of the angle sensing system for applications which only require a relative angle measurement and a continuous angular output. The resolution of angle measurement is also limited by the resolution of the hardware devices. In view of the above, it is apparent that there exists a need for a system and method for sensing the angle and angular displacement of a shaft using low cost Hall effect sensors with improved resolution.

SUMMARY

In satisfying the above need, as well as overcoming the enumerated drawbacks and other limitations of the prior art, in an embodiment of the present invention a system and a method for sensing the angle and angular displacement in a system with a DC brushless motor using Hall effect sensors is provided. More specifically, three Hall effect sensors are mounted in the DC motor. The Hall effect sensors provide three electrical angles of the motor rotor which are used in an angular displacement signal processor that is implemented in hardware and software. The angular displacement signal processor provides an improved resolution angular displacement output. Based on the angular displacement output from the angular displacement signal processor and the motor control command signal from the motor drive, an output state observer is applied to generate a high resolution angular displacement signal referred to as the observed angular displacement.

In an embodiment of the present invention, the Hall effect sensor signals are communicated to a angular displacement signal processor. The angular displacement signal processor includes three functional blocks. The first functional block determines the direction of the angular displacement using two of the Hall effect sensor signals. The second functional block combines the three Hall effect sensor signals to provide a pulse signal which has a frequency that is six times the frequency of each Hall effect sensor signal. The pulse signal from the second functional block and the angular direction signal from the first functional block are provided to a third functional block. The third functional block is a counter block that provides a continuous output corresponding to the angular displacement.

The angular output of the angular displacement signal processor can then be provided as an input to an output state observer. The output state observer receives the motor control command signal from the motor drive and the angular displacement signal from the angular displacement signal processor to generate an angular displacement signal with a high resolution termed the observed angular displacement.

In another embodiment, the Hall effect sensor signals are communicated to three encoder interface circuits. The two of the three Hall effect sensor signals are distributed to the inputs of each encoder interface circuit. The output from the encoder interface circuits are provided to a mathematical operation unit which generates an angular displacement signal with six times resolution to each of the Hall effect sensor signals.

In another aspect of the invention the output of the mathematical operation unit is provided to an output state observer. The output state observer receives the angular displacement signal from the mathematical operation unit and the motor control command signal from the motor drive to generate the observed angular displacement signal.

Additional benefits and advantages of the present invention will become apparent to those skilled in the art to which the present invention related from the subsequent description of the preferred embodiment and the appended claims, taken in conjunction with the accompanying drawings.

DETAILED DESCRIPTION

Figure 1:
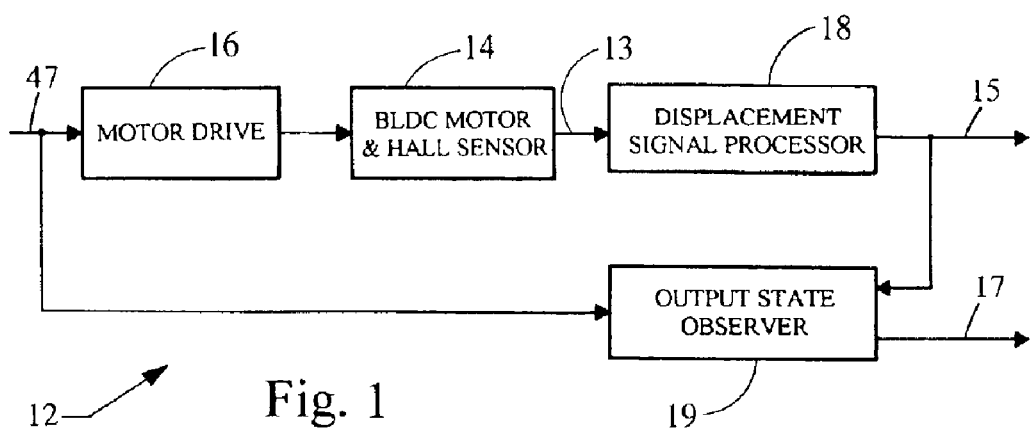
FIG. 1 is a schematic diagram of an angular displacement sensing system including a brushless DC motor.
Figure 3A:
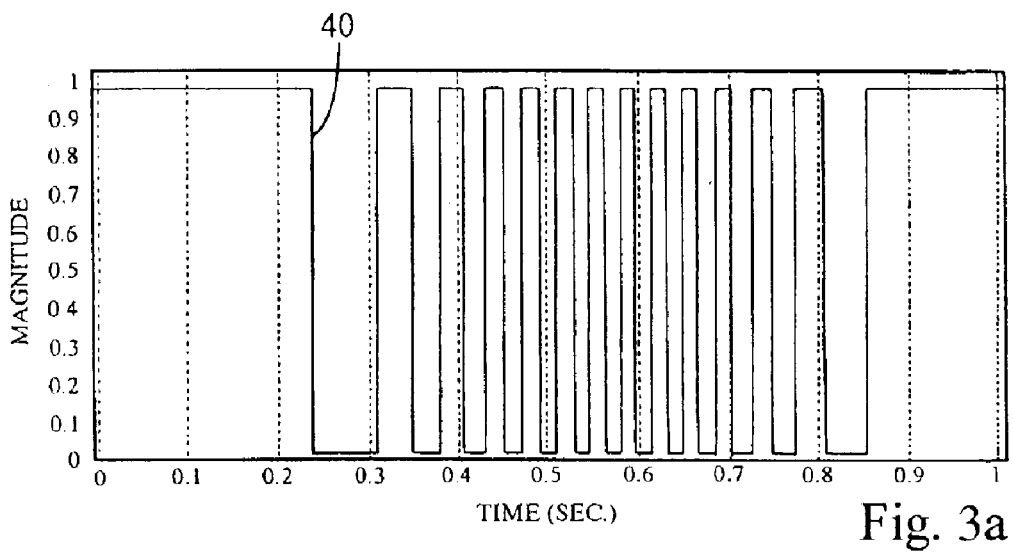
FIG. 3(a) is a plot of the phase A output of the first Hall effect sensor.
Figure 3B:
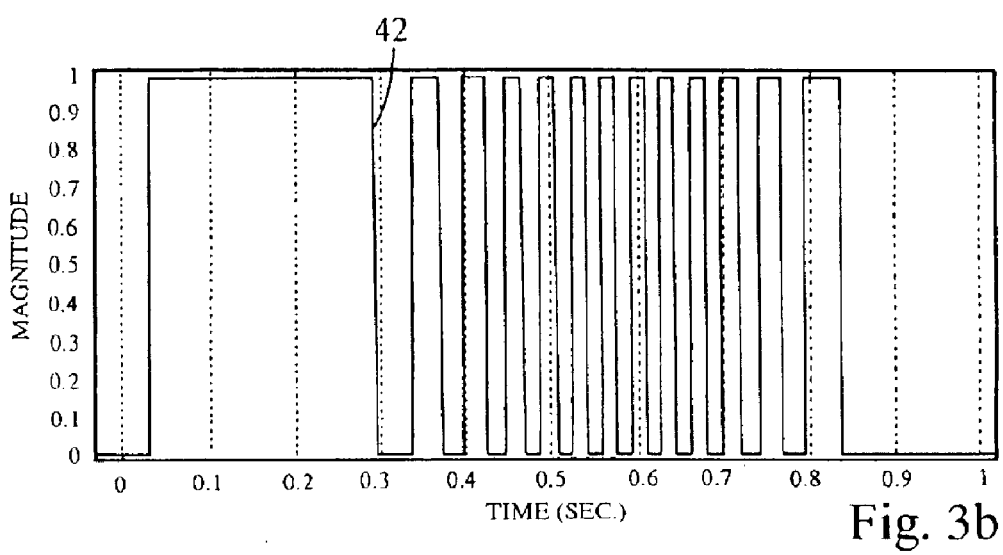
FIG. 3(b) is a plot of the phase B output of the second Hall effect sensor.

Now referring to FIG. 1, an angular displacement sensing system 12 is provided according to an embodiment of the present invention. The angular displacement sensing system 12 includes a brushless DC motor 14, a motor drive 16, an angular displacement signal processor 18 and output state observer 19. The brushless DC motor 14 uses three Hall effect sensors to provide motor commutation signals and uses a motor drive 16 to implement control for motor torque output. The angular displacement signal processor 18 receives the Hall effect sensor signals 13 from three Hall effect sensors mounted in the brushless DC motor 14, and generates an improved resolution angular displacement output 15. Based on the angular displacement output 15 from angular displacement signal processor 18 and motor drive input signal 47 from the motor drive 16, an output state observer 19 generates a high resolution angular displacement signal 17 which is referred to as the observed angular displacement 17.

Figure 2:
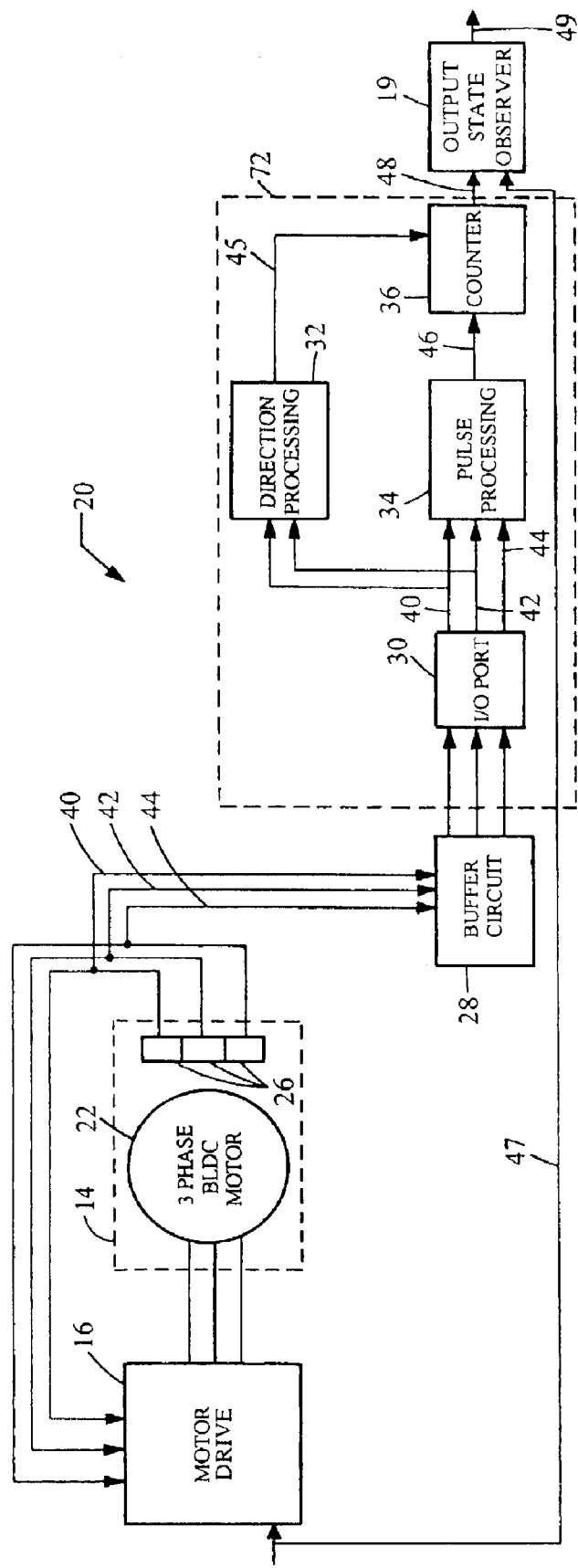
FIG. 2 is a block diagram of an angular displacement sensing system including a motor and its drive, Hall effect sensors, an angular displacement signal processor, and an output state observer in accordance with present invention.
Figure 3C:
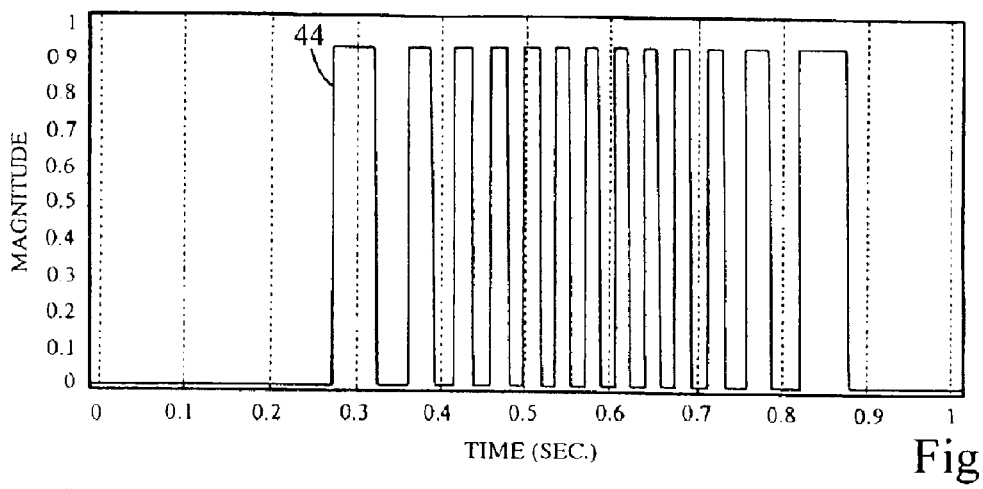
FIG. 3(c) is a plot of phase C of the third Hall effect sensor.

Now referring to FIGS. 2–5, an angular displacement sensing system 20 and Hall effect sensor signal output plots embodying the principles of the present invention are illustrated. FIG. 2 shows the angular displacement sensing system including a brushless DC motor 22 with three Hall effect sensors 26, the motor drive 16, an angular displacement signal processor 72 and an output state observer 19. The three Hall effect sensors 26 are mounted into the motor 22 and motor drive 16 is in communication with motor 22 to control motor movement according to commutation logic based on the signals of three Hall effect sensors 26. Three Hall effect sensors 26 generate three sensor signals 40, 42 and 44 indicative of the angular displacement of a rotor in motor 22. The first sensor signal 40 as shown in FIG. 3(a) is a series of pulses. FIG. 3(b) shows the second sensor signal 42. The second sensor signal 42 is shifted 120° out of phase with the first sensor signal 40. FIG. 3(c) shows the third sensor signal 44. The third sensor signal 44 is 240° out of phase with the first sensor signal 40. The three sensor signals 40, 42 and 44 are received by a buffer circuit 28. The buffer circuit 28 transmits the sensor signals to the angular displacement signal processor 72.

The angular displacement signal processor 72, shown in FIG. 2, includes an I/O port 30, a direction processing functional block 32, a pulse processing functional block 34, and a counter functional block 36. The angular displacement signal processor 72 can be implemented using a software program in an embedded system or using a hardware circuit. The software program implementation for an embedded system is described below.

The output signals of the buffer circuit 28, Hall effect sensor output signals 40, 42 and 44, are received by the I/O port 30 and read into the embedded system. I/O port 30 transmits two of the three Hall effect sensor signals 40, 42, and 44 to the direction processing functional block 32. The direction processing functional block 32 indicates the direction of rotation of the brushless DC motor 22 according to the phase information using two of the Hall effect sensor signals 40, 42 and 44.

For example, Hall effect sensor signals 40, 42 are transmitted to direction processing functional block 32. The value 0 is generated for output signal 45 by the direction processing functional block 32 to indicate clockwise rotation of motor 22 when Hall effect sensor signal 40 indicates phase A is in a high logic state (signal value 1) and Hall effect sensor signal 42 indicates phase B is in a low logic state (signal value 0). The value 1 is generated for output signal 45 by the direction processing functional block 32 to indicate counter-clockwise rotation of motor 22 when Hall effect sensor signal 40 indicates phase A is in a low logic state and Hall effect sensor signal 42 indicates phase B is in a high logic state.

Figure 4:
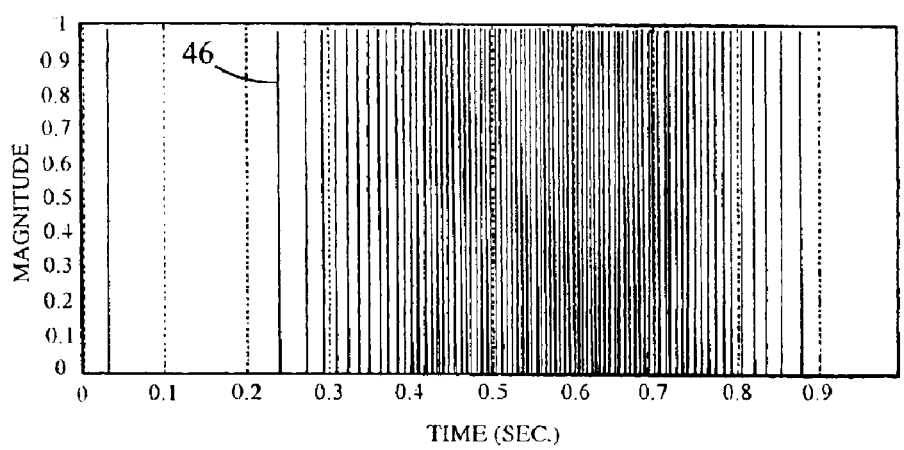
FIG. 4 is a plot of the output of the logic processing unit.

The I/O port 30 also transmits the three Hall effect sensor signals 40, 42, 44 to the pulse processing functional block 34 in FIG. 2. The pulse processing functional block 34 combines the three Hall effect sensor signals 40, 42, 44 to create a continuous pulse signal 46 by a logical operation as shown in FIG. 4. The frequency of continuous pulse signal 46 is six times of the frequency of the Hall effect sensor signals 40, 42, 44.

Figure 5:
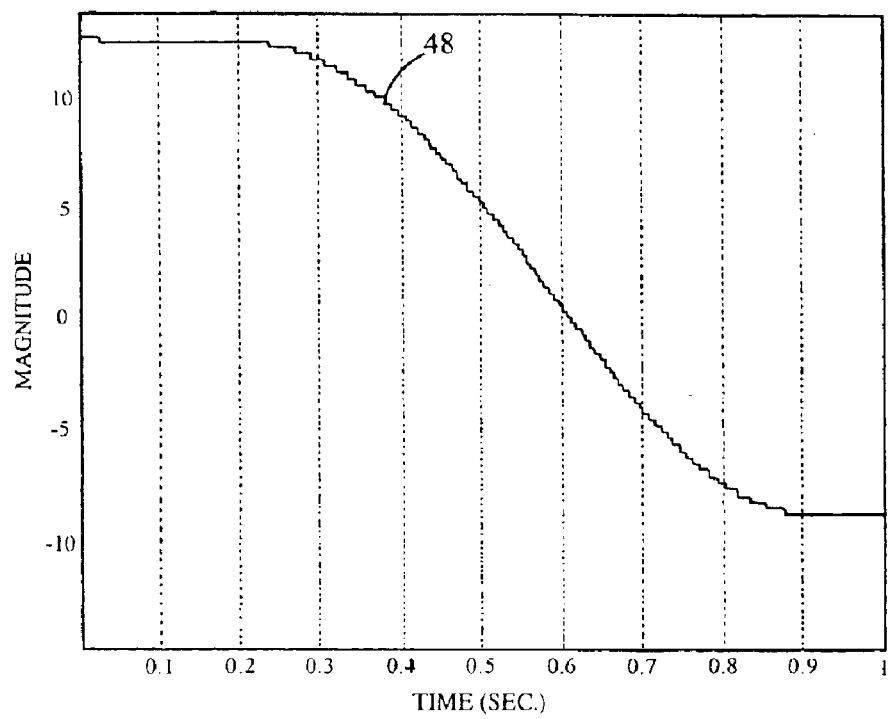
FIG. 5 is a plot of the output of the counter.

The counter function block 36 combines the output signal 45 from the direction processing functional block 32 and the continuous pulse signal 46 from the pulse processing functional block 34 to generate an angular displacement signal 48 with direction indication. The angular displacement signal 48 is a continuous signal, as shown in FIG. 5, created by incrementing or decrementing the count for each pulse of the continuous pulse signal 46 provided by the pulse processing functional block 34. Thus, the angular displacement signal processor 72 in FIG. 2 generates a continuous angular displacement output signal with improved resolution relative to the pulse signals of Hall effect sensors 26. The angular displacement signal 48 can achieve a resolution of $1/(6 \times \text{pole number of the motor 22})$.

Figure 6:
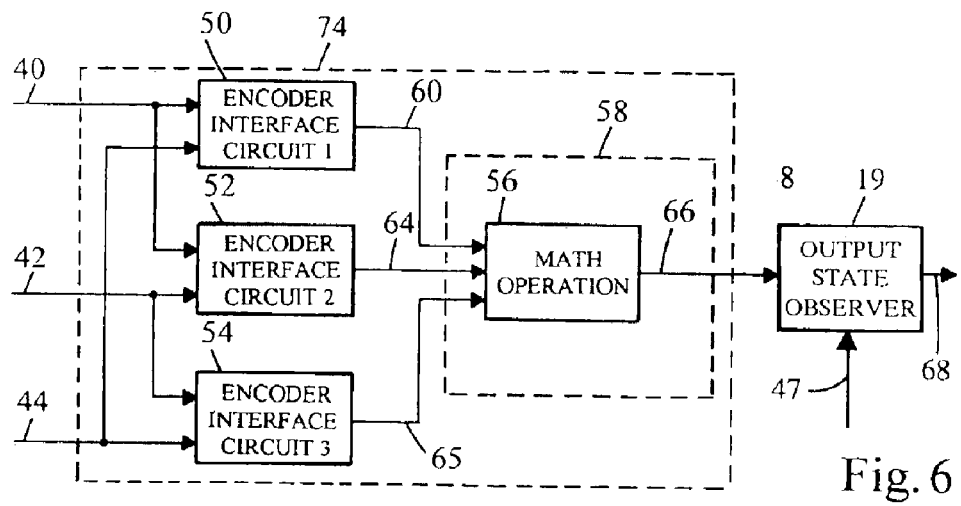
FIG. 6 is a block diagram of another embodiment of the angular displacement sensing system.

Now referring to FIG. 6, another embodiment of the angular displacement sensing system provides for a angular displacement signal processor 74 including three encoder interface circuits 50, 52, 54 and an integrated processing unit 58 for performing a mathematical operation 56. Encoder interface circuits 50, 52, and 54 are known devices which receive two phase-shifted digital signals from an incremental encoder to produce a continuous angle signal with indication of direction. One such encoder interface circuit is commercially available on the DS 3001 incremental encoder interface board manufactured by dSPAC Gmbh of Paderborn, Germany.

As shown in FIG. 6, three Hall effect sensor signals 40, 42, 44 are communicated to the encoder interface circuits 50, 52, 54 in the angular displacement signal processor 74. The first Hall effect sensor signal 40 and the third Hall effect sensor signal 44 are connected to the first encoder interface circuit 50. The first encoder interface circuit 50 combines Hall effect sensor signals 40, 44 to generate the first output signal 60. The first Hall effect sensor signal 40 and the second Hall effect sensor signal 42 are connected to the second encoder interface circuit 52 to generate the second output signal 64. The second Hall effect sensor signal 42 and the third Hall effect sensor signal 44 are connected to the third encoder interface circuit 54. The third encoder interface circuit 54 combines the Hall effect sensor signals 42, 44 to generate the third output signal 65. Output signals 60, 64, 65 from encoder interface circuits 50, 52, 54 are received by the integrated signal unit 58 and provided as input signals to the math operation 56.

The mathematical operation 56 performs a real time processing on the three output signals 60, 64, 65 from encoder interface circuits 50, 52, 54, shown in FIG. 6, to generate an angular displacement signal 66. For example, the output signals 60, 64, 65 are processed according to the relationship $$\alpha = \sum_{i=1}^{3} \theta_i / 3;$$

where α corresponds to the angular displacement signal 66 and $\theta_i$ corresponds to the encoder interface circuit output signals 60, 64, 65.

As one skilled in the art will appreciate, many mathematical operations may be effectively used to generate an angular displacement signal 66 from output signals 60, 64, 65 of the encoder interface circuits 50, 52, 54.

As mentioned above, the output state observer 19 shown in FIG. 1 can be used in cooperation with either embodiment of the present invention. As shown in FIG. 2, the output state observer 19 receives the angular displacement signal 48 from the angular displacement signal processor 72 and the motor control command signal 47 to generate a high resolution angular displacement signal 49. Alternatively, as shown in FIG. 6, the angular displacement signal 66 from the angular displacement signal processor 74, and the motor control command signal 47 from motor drive 16 are received by the output state observer 19. Output state observer 19 generates a high resolution angular displacement signal 68 which is referred to as the observed angle or observed angular displacement.

Figure 7:
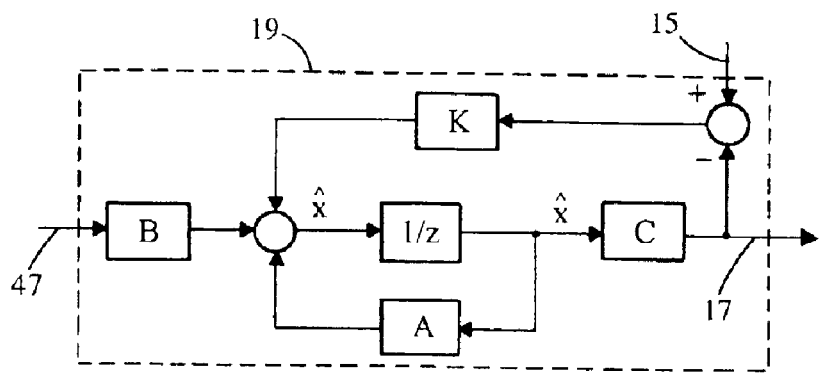
FIG. 7 is a block diagram illustrating a general output state observer in the angular displacement sensing system in accordance with present invention.
Figure 8:
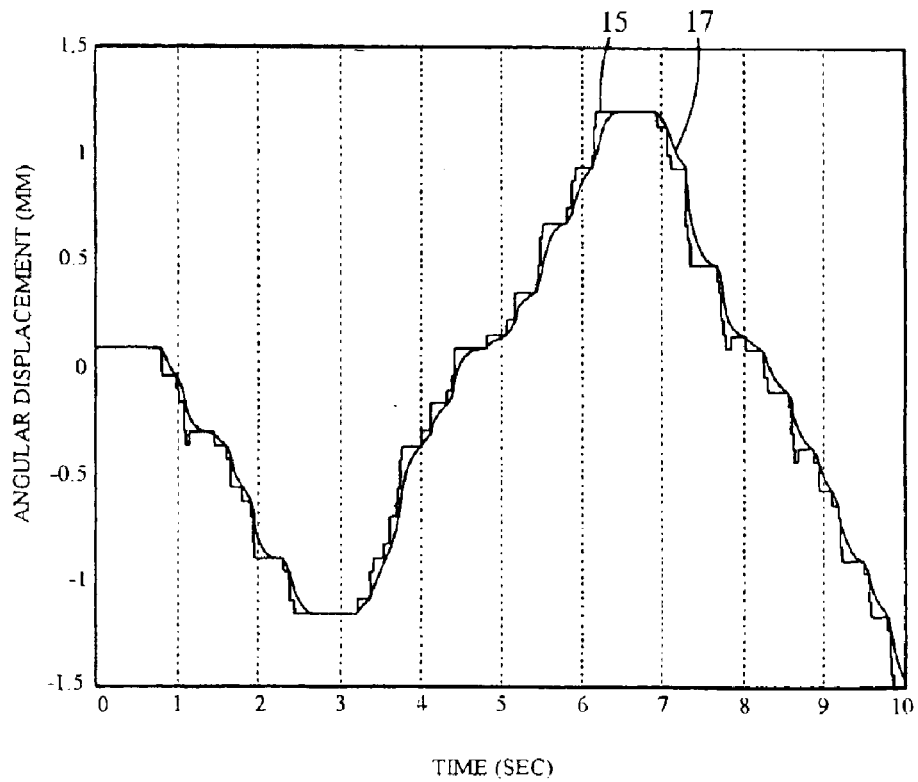
FIG. 8 is a plot of the input and output of the output state observer.

Now referring to FIGS. 7 and 8 to describe the general implementation of the output state observer 19 with reference to FIG. 1, the output state observer 19 receives the angular displacement signal ($\theta_{disp}$) 15 from angular displacement signal processor and the motor control command signal ($u_c$) 47 from the motor drive to generate the observed angular displacement ($\theta_{obs}$) 17. The state space equation description of the output state observer in FIG. 7 is given as follows:

$$\hat{\dot{x}} = A\hat{x} + Bu_c + K(\theta_{disp} - C\hat{x}) \quad \text{(1a)}$$

$$\theta_{obs} = C\hat{x} \quad \text{(1b)}$$

where $\theta_{disp}$ is the input angular displacement signal from the angular displacement signal processor; $u_c$ is the motor control command signal from motor drive 16; $\theta_{obs}$ is the resultant observed angular displacement signal 17 generated by the output state observer 19; $\hat{x}$ is the state to be observed;

$\hat{\dot{x}}$ is a derivative of state $\hat{x}$; K is the observer gain which is determined by the output state observer design; A, B, and C are matrices indicative of the controlled plant model between the motor control command signal $u_c$ and angular displacement signal $\theta_{disp}$. To provide additional background information on the functioning of a signal state observer "Parameterization of observers for time delay systems and its application in observer design", IEE Proceedings: Control Theory and Applications 143, 3 May 1996, IEE p 225–232 1350–2379 by Yao, Y. X.; Zhang, Y. M.; Kovacevic, R; is incorporated herein by reference.

In this embodiment, the output state observer provides angular displacement $\theta_{obs}$ based on angular displacement signal $\theta_{disp}$ and motor control command signal $u_c$ by using the system described in Equations (1a) and (1b) and shown in the block diagram of FIG. 7. The output state observer receives the angular displacement signal $\theta_{disp}$ from the angular displacement signal processor and subtracts $\theta_{disp}$ with the observed angular displacement $\theta_{obs}=C\hat{x}$ to generate error signal ($\theta_{disp}-C\hat{x}$). The output state observer uses the observer gain K to minimize the error ($\theta_{disp}-C\hat{x}$) in Equations (1a) and (1b). The observed angular displacement signal $\theta_{obs}$ is smoothed to improve the resolution relative to the angular displacement signal $\theta_{disp}$.

The controlled plant model between the motor control command signal $u_c$ and angular displacement signal $\theta_{disp}$ is modeled as follows:

$$\dot{x} = Ax + Bu_c \quad \text{(2a)}$$

$$\theta_{disp} = Cx \quad \text{(2b)}$$

where $\theta_{disp}$ is the angular displacement signal from the angular displacement signal processor, $u_c$ is the motor control command signal from the motor drive, x are states of the controlled plant, $\dot{x}$ is derivative of state x, and A, B, and C are constant matrices. The output state observer in Equations (1a) and (1b) provides an observation for the angular displacement signal $\theta_{disp}$ based on the controlled plant description (2a) and (2b). The constant matrices A, B, and C determine the order and parameters of the controlled plant.

The output state observer 19 provides a higher resolution output signal. More specifically, the output state observer 19 in FIG. 7 acts as a signal predictor for the angular displacement signal 15. The observer 19 minimizes the error between the angular displacement signal 15 and observed angular displacement signals 17.

FIG. 8 shows a plot of the angular displacement signal 15 as an input of the output state observer 19 (shown in FIG. 7) and the observed angular displacement as an output 17 of the output state observer 19 (shown in FIG. 7). The plot in FIG. 8 illustrates that the output state observer 19 (shown in FIG. 7) provides smooth observed angular displacement signal 17 with the minimal acceptable time delay relative to the angular displacement signal 15.

The present invention has many advantages and benefits over the prior art. For example, the present invention provides a high resolution signal suitable for steer-by-wire applications. Further, the present invention has high reliability and a significantly lower cost as compared to alternatives offered by the prior art.

As a person skilled in the art will readily appreciate, the above description is meant as an illustration of implementation of the principals of this invention. This description is not intended to limit the scope or application of this invention in that the invention is susceptible to modification, variation and change, without departing from the spirit of this invention, as defined in the following claims.

I claim:

1. A method for sensing angular displacement, wherein a brushless DC motor includes a rotor and a plurality of sensors are mounted in the brushless DC motor, the method comprising:

measuring a plurality of sensor signals indicative of the angular displacement of the rotor using the plurality of sensors;

calculating a direction signal using the plurality of sensor signals;

combining the plurality of sensor signals to produce a plurality of intermediate signals;

combining the plurality of intermediate signals with the direction signal to calculate a first angular displacement signal; and calculating a second angular displacement signal by processing a motor control command signal and the first angular displacement signal.

2. A method for sensing angular displacement, wherein a brushless DC motor includes a rotor and a plurality of sensors are mounted in the brushless DC motor, the method comprising:
measuring a plurality of sensor signals indicative of the angular displacement of the rotor using the plurality of sensors;
combining the plurality of sensor signals using a plurality of encoder interface circuits to produce a plurality of intermediate signals; and
combining the plurality of intermediate signals using a mathematical operation to provide a first angular displacement signal.

3. The angular sensing system according to claim 2, wherein the mathematical operation, is an averaging operation in accordance with the relationship $$\alpha = \sum_{i=1}^{z} \theta i / z$$

where α corresponds to the first angular displacement signal, θi corresponds to the plurality of intermediate signals calculated by the encoder interface circuits, and z corresponds to a number of signals contained in the plurality of intermediate signals.

4. The method for sensing angular displacement according to claim 2, comprising calculating a second angular displacement signal by combining a motor control command signal and the fist angular displacement signal.

5. The method for sensing angular displacement according to claim 2, wherein calculating a second angular displacement signal is in accordance with the relationship:

$$\dot{\hat{x}} = A\hat{x} + Bu_c + K(\theta_{disp} - C\theta_{obs}):$$

$$\theta_{obs} = C\hat{x};$$

where $\theta_{disp}$ is the first angular displacement signal; $u_c$ is the motor control signal; A, B, and C are constant matrices indicative of the controlled plant model between the motor control signal ($u_c$) and the first angular displacement signal ($\theta_{disp}$); K is the observer gain which is determined by the output state observer design to minimize the error of ($\theta_{disp}$–$C\theta_{obs}$); $\theta_{obs}$ is the second angular displacement signal; $\hat{x}$ is a state to be observed; and $\dot{\hat{x}}$ is a derivative of state $\hat{x}$.

6. An angular displacement sensing system comprising:
a brushless DC motor having a rotor, the brushless DC motor being driven by a motor control command signal;
a plurality of sensors mounted in the brushless DC motor, wherein the plurality of sensors produce a plurality of sensor signals indicative of an angular position of the rotor;
a plurality of encoder interface circuits coupled to the plurality of sensors, the plurality of encoder interface circuits being adapt to generate a plurality of intermediate signals using the plurality of sensor signals; and
an integrated unit coupled to the plurality of encoder interface circuits, the integrated unit being adapted to receive the plurality of intermediate signals, the integrated unit being adapted to perform a mathematical operation on the plurality of intermediate signals to provide a first angular displacement signal.

7. The angular displacement sensing system according to claim 6, wherein each of the encoder interface circuit of the plurality of encoder interface circuits receives two sensor signals of the plurality of sensor signals.

8. The angular displacement sensing system according to claim 6, wherein the mathematical operation, is an averaging operation in accordance with the relationship $$\alpha = \sum_{i=1}^{z} \theta i / z;$$

wherein α corresponds to the first angular displacement signal, θi corresponds to the plurality of intermediate signals generated by the plurality of encoder interface circuits, and z corresponds to a number of signals contained in the plurality of intermediate signals.

9. The angular displacement sensing system according to claim 6, wherein the first angular displacement signal is processed with the motor control command signal to produce a second angular displacement signal.

10. The angular displacement sensing system according to claim 9, wherein the first angular displacement signal is processed with the motor control command signal to generate the second angular displacement signal in accordance with the relationship:

$$\dot{\hat{x}} = A\hat{x} + Bu_c + K(\theta_{disp} - C\theta_{obs}):$$

$$\theta_{obs} = C\hat{x};$$

where $\theta_{disp}$ is the first angular displacement signal; $u_c$ is the motor control command signal; A, B, and C are constant matrices indicative of the controlled plant model between the motor control command signal ($u_c$) and the first angular displacement signal ($\theta_{disp}$); K is the observer gain which is determined by the output state observer design to minimize the error of ($\theta_{disp}$–$C\theta_{obs}$) is the second angular displacement signal; $\hat{x}$ is a state to be observed; and $\dot{\hat{x}}$ is a derivative of state $\hat{x}$.

11. The angular displacement sensing system according to claim 9 wherein the plurality of encoder interface circuits has three encoder interface circuits and the plurality of sensor signals has three sensor signals.

12. The angular displacement sensing system according to claim 11, wherein the first sensor signal and the second sensor signal are connected to the first encoder interface circuit, the first sensor signal and the third sensor signal are connected to the second encoder interface circuit, and the second sensor signal and the third sensor signal are connected to the third encoder interface circuit.

* * * * *

UNITED STATES PATENT AND TRADEMARK OFFICE
CERTIFICATE OF CORRECTION

PATENT NO. : 6,941,822 B2
DATED : September 13, 2005
INVENTOR(S) : Yixin Yao

It is certified that error appears in the above-identified patent and that said Letters Patent is hereby corrected as shown below:

<u>Column 7,</u>
Line 4, before "angular displacement signal." delete "fist" and substitute -- first -- in its place.

Signed and Sealed this

Twenty-third Day of May, 2006

JON W. DUDAS
*Director of the United States Patent and Trademark Office*